(12) United States Patent
Allard

(10) Patent No.: US 6,875,350 B2
(45) Date of Patent: Apr. 5, 2005

(54) CHITOSAN ENHANCED DEWATERING BAG

(75) Inventor: Douglas Paul Allard, Santa Rosa, CA (US)

(73) Assignee: KriStar Enterprises, Inc., Santa Rosa, CA (US)

( * ) Notice: Subject to any disclaimer, the term of this patent is extended or adjusted under 35 U.S.C. 154(b) by 0 days.

(21) Appl. No.: 10/053,978

(22) Filed: Jan. 18, 2002

(65) Prior Publication Data

US 2003/0136719 A1 Jul. 24, 2003

(51) Int. Cl.$^7$ .................................................. C02F 1/54
(52) U.S. Cl. ........................ 210/209; 210/650; 210/170; 210/321.6; 210/460
(58) Field of Search ................................ 210/209, 460, 210/321.6, 170, 650; 405/42, 36; 47/48.5; 55/374

(56) References Cited

U.S. PATENT DOCUMENTS

| | | | | |
|---|---|---|---|---|
| 5,511,904 A | * | 4/1996 | Van Egmond | 405/52 |
| 6,334,953 B1 | * | 1/2002 | Singleton | 210/232 |
| 2002/0130070 A1 | * | 9/2002 | Roesner | 210/163 |

FOREIGN PATENT DOCUMENTS

JP          2001170648 A  *  6/2001  ............. C02F/1/50

OTHER PUBLICATIONS

Vanson, Inc.; web page: Storm Water Applications: Vanson; http://vanson.con/chi/; 2001; 1 page.*
Dandy Products, Inc.; web page: "Dandy Dewatering Bag"; http://www.dandyproducts.com/Dewatering%20bag%20page.htm; © 1999–2001; 3 pages.
Vanson, Inc.; web page: "Product Information : Chitin / Chitosan : Vanson"; http://vanson.com/chi/; 1 page.
Vanson, Inc.; web page: "Waste Water Applications : Vanson"; http://vanson.com/wwa/; ©2001, 2 pages.
Vanson, Inc.; web page: "VANSON Chitin Chitosan and Chitosan Derivativ . . . "; http://vanson.com/swa/; ©2001; 2 pages.
Vanson, Inc.; web page: "Storm Water Applications : Vanson"; http://vanson.com/chi/; ©2001; 1 page.

* cited by examiner

Primary Examiner—Frank M. Lawrence
Assistant Examiner—Douglas J. Theisen
(74) Attorney, Agent, or Firm—Howrey Simon Arnold & White, LLP

(57) ABSTRACT

A chitosan enhanced dewatering bag reduces the amount of silt, sedimentation and suspended solids from incoming water. The dewatering bag includes a first permeable membrane having a first open end or opening, and one or more applications of chitosan located within the bag. A second permeable member may be attached to the first permeable membrane so that it defines at least a portion of the outer surface of the dewatering bag. A baffle wall may also be located inside the dewatering bag to reduce the access of silt and sediment to this second permeable membrane. Fluid entering the first opening can readily flow through the dewatering bag, while unwanted dirt and other solids are impeded from such flow.

24 Claims, 3 Drawing Sheets

CHITOSAN ENHANCED DEWATERING BAG

FIELD OF THE INVENTION

The present invention relates generally to treating or clarifying polluted or dirty water and more particularly to devices and apparatuses for use in reducing the amount of silt, sedimentation and debris in storm water runoff or standing bodies of accumulated water being pumped or otherwise dispersed.

BACKGROUND OF THE INVENTION

In response to tighter guidelines recently imposed by the federal Environmental Protection Agency under the Clean Water Act, controlling pollution, silt and sediment found in storm water runoff and other sources of water is receiving ever-increasing attention at all levels of government, federal, state and local. Federal and state agencies have issued mandates and developed guidelines regarding the prevention of non-point source (storm water caused) pollution that require local governments to act upon or initiate. These mandates affect water runoff from storms and also from other sources on slopes and construction sites. In addition, there are many other laws and regulations in place that restrict how any significant amount of water may be moved or disposed. Such laws and regulations have a significant impact on not only how storm water may be channeled and diverted, but also on, for example, the ways that contractors can dispose of excess or unwanted water from constructions sites. Regulations also exist as to how clean water must be as it is pumped away or "dewatered" from lakes, ponds and water filled trenches, such that undesirable excess silt and particles are not introduced into streams, storm sewers and surrounding property.

Dewatering bags, also known as "dirt bags," are a common way of filtering or treating dirty water that must be pumped or otherwise moved from one location to another. Such dewatering bags are manufactured and sold commercially by numerous entities, with examples including ACF Environmental of Richmond, Va., and Dandy Products, Inc. of Grove City, Ohio. Dewatering bags generally resemble a large bladder comprised of a permeable filtering membrane, such as a non-woven geotextile fabric, and are typically rectangular in nature, although other shapes may be available. Sizes vary widely according to anticipated fluid flow rates, and range anywhere from about four feet square to about fifteen feet square. An inlet spout extending from one side of the dewatering bag is typically able to accept an inlet hose or pipe up to six inches in diameter. Water may be pumped into the dewatering bag from the desired source through this inlet hose or pipe at rates up to 1500 gallons per minute, depending upon factors such as the size of the bag and the permeability of the membrane. In the event that such high flows are desired, the typical solution is to use an extremely large dewatering bag, such as one that is fifteen feet by fifteen feet. Use of such large bags can be cumbersome and include added cost, however, and such use also tends to subject a much greater load on any surface upon which the bag rests, which may be detrimental should such a surface comprise grass or ground susceptible to erosion. In addition, use of large dewatering bags forces a user to disperse of large outflows of water in one large localized area, and in some cases a sufficiently large area or surface may not be convenient or available. Accordingly, improved methods and systems for dewatering at large flow rates are desired.

Referring now to FIG. 1, a top perspective view of a prior art dewatering bag in operation is illustrated. In a typical application, a dewatering bag 10 is laid flat wherever pumped water is desired to be dispersed, and is ideally placed atop a bed of vegetation, straw, gravel or any other aggregate base 20 such that filtration and permeation through the bottom of the bag may be maximized. Dewatering bags may be used on either sloped or level surfaces as needed, and each type of surface has its own separate advantages. Once a source hose or pipe 30 is inserted into an inlet spout 11, a tie down strap or rope 12 firmly wraps around the inlet spout to secure it in place and prevent gross leakage of unfiltered water. Dirty water is then pumped into the dewatering bag, and the bag tends to balloon up in size as it fills. At the same time that water is being pumped into the bag, water 13 is constantly seeping out of or otherwise escaping the bag through the permeable material around all sides, top and bottom of the bag. Because the dewatering bag is made from a fabric or other type of permeable membrane 14, however, much of the sediment, silt and suspended solids in the incoming water are retained inside the bag. Of course, a very fine filtration level of the permeable membrane would result in a reduced aggregate flow capacity out of all sides of the bag, such that under most reasonable output flows, a good amount of sediment and fine solids do nevertheless pass through the membrane with the outgoing water. Because many laws and regulations only require that pumped water be treated or clarified in some minimal way, however, a mere reduction in the murkiness of the water is sufficient for most dewatering bag applications. As regulations tighten or various applications require a higher standard of treatment for dirty or murky water, better methods and systems for dewatering at reasonably high flow rates may thus be needed.

One of the drawbacks to existing dewatering bags is that such bags are typically disposable and are designed to be used only once before being thrown away. In addition, silt, sedimentation and mud build up inside a dewatering bag rapidly during regular use, such that these solids begin to line the permeable membrane from the inside and otherwise clog the bag. Such buildup reduces the effective outflow capacity of the bag in short order to the point where the disposable bag is no longer useful, and the average lifespan of most dewatering bags is quite short. In fact, many applications will require numerous dewatering bags to pump away a desired body of water, with each used up dewatering bag being disposed of or thrown away as it fills with mud and silt. Not only can use of multiple disposable bags be costly, but such use may also be harmful to the environment in some cases where bags must be thrown away. Accordingly, better methods and systems for recycling and reusing dewatering bags are desired.

Chitosan is a well-known material that is derived from a naturally occurring substance called chitin, which is a polysaccharide found in the exoskeleton of shellfish such as shrimp, lobster, and or crabs. While chitosan is has recently gained popularity as a dietary supplement, its inherent ability to generate small electrical charges has also provided benefits in the processing of contaminated items, such as wastewater. In turbid or polluted water, the electrical charges given off by chitosan react with the small electrical charges in pollution, fine silt and sediment particles, such that many of these tiny bits of contamination and silt coagulate together into larger chunks. These larger coagulated chunks of particles can then be filtered more easily from the fluid and are also more prone to settle to the bottom of the fluid body via gravity. An appropriate application of chitosan can render a body of muddy water as fairly clear in a short period of time. While chitosan and chitin have been previously used to some extent in the treatment of wastewater, their use has yet to reach the field of storm water runoff or other dirty water coming under other concerns of the Clean Water Act, with its accompanying objective to filter or clarify such water. Accordingly, more effective devices and systems are desired for filtering or clarifying polluted or dirty water using chitosan technologies.

SUMMARY OF THE INVENTION

The present invention is directed to toward an apparatus comprising one or more reusable dewatering bags that are particularly useful in clarifying dirty or muddy water, and that may be connected in tandem as any particular application requires. These dewatering bags are substantially comprised of one or more permeable membranes, such that water can seep out of or otherwise escape through these membranes in all directions. According to a preferred embodiment of the present invention, chitosan is placed inside at least one dewatering bag at one or more optimal locations. This chitosan may be in one of several different forms, although a time-release gel form is particularly preferred.

A single dewatering bag comprises a first permeable membrane having a first open end or opening, a second end, an interior space, and a plurality of fine openings or passageways in the permeable membrane communicating said interior space with the exterior of the dewatering bag. The first permeable membrane preferably comprises a non-woven geotextile fabric capable of passing fluid. One open end comprises an inlet to accommodate incoming water to be filtered or clarified, and a second end may be closed or sewn off, or alternatively may comprise an outlet for releasing or passing overflow. In a preferred embodiment, both ends comprise built-in spouts that branch away from the general mass of the dewatering bag. Such spouts are designed to accommodate an inlet hose or pipe, and tie down straps or ropes are used to firmly wrap around the spout and secure the inlet pipe or hose therein. A plurality of dewatering bags may be connected together from outlet to inlet, and such connections may be facilitated via the use of connecting pipes or hoses of any desired length.

In a preferred embodiment, chitosan is applied at one or more optimized locations inside the dewatering bag such that its exposure to incoming water is maximized. As a result, the chitosan enhanced dewatering bag is capable of coagulating fine solids into larger particles, such that passage of pollution, silt and sediment through the fine openings in the permeable membrane of the dewatering bag is reduced. Although any form of chitosan may be applied, use of a time release gel form is preferred. In a particularly preferred application, bars of a time release gel form of chitosan are inserted and sewn into a permeable fabric sock, and preferably each gel bar is sewn into a separate compartment within the fabric sock. This fabric sock containing multiple chitosan gel bars comprises a loop attached to a distal end of the sock, such that the entire sock may be anchored to the inside of an inlet spout of the dewatering bag. This fabric sock containing one or more chitosan gel bars is ideally anchored within the inlet spout such that the entire sock becomes centrally and horizontally suspended within the inlet spout and inner space of the dewatering bag while any substantial fluid flow enters the inlet spout and dewatering bag. Alternatively, one or more of such fabric socks may be anchored further into the inlet spout, or in other locations inside the dewatering bag.

In a particularly preferred embodiment, a second permeable membrane defines at least a portion of the outer surface of the dewatering bag, and preferably extends from one side of the bag to the other side along a top surface. This second permeable membrane also has a plurality of fine openings communicating at least a portion of the interior space of the bag with the exterior of the second permeable membrane. The permeability rate of second permeable membrane is preferably much greater than the permeability rate of first permeable membrane, such that fluid escapes the dewatering bag much faster through the section defined by this second permeable membrane. In addition, a baffle wall is located inside the dewatering bag to reduce the access of silt and sediment to this second permeable membrane. This baffle wall preferably extends from one side of dewatering bag to an opposing side, such that this baffle wall separates the interior space of the dewatering bag into a first interior space and a second interior space. The inlet then directs fluid into the first interior space, while the second permeable membrane passes fluid out of the second interior space, such that most silt, sedimentation and suspended solids are retained within first interior space. This baffle wall also preferably extends from the bottom of the dewatering bag to the top, and is integrally formed with the first permeable membrane, such that the baffle wall also comprises a non-woven geotextile fabric capable of passing fluid. The baffle wall comprises one or more enlarged openings for communicating the first interior space with the second interior space, and these openings are preferably toward the upper part of the baffle wall and are dimensioned not to exceed in sum the cross-sectional area of the inlet to the dewatering bag.

Another embodiment of the present invention comprises one or more zippers traversing one or more outer edges or seams of the dewatering bag, such that the interior space of the bag is readily accessible. Accumulated silt, mud and debris may then be removed from the dewatering bag and disposed of such that the bag can be emptied and reused. Any application of chitosan may also be readily renewed via the zippers.

DETAILED DESCRIPTION OF THE INVENTION

Recent water clarification technologies, such as those involving the use of chitosan, offer new opportunities to treat and clarify dirty or polluted water. The present invention provides improved devices and methods for treating and clarifying such water from numerous sources. One object of the present invention is to improve the ability of water treatment devices to remove unwanted pollution and solids from incoming water. Another object is to provide systems and devices that are more flexible in application and that may be reusable. These and other useful objects are achieved by the improved devices and methods disclosed herein. In the following detailed description, references are made to the accompanying drawings, which form a part of the description and in which are shown, by way of illustration, specific embodiments of the present invention. Although these embodiments are described in sufficient detail to enable one skilled in the art to practice the invention, it is understood that these examples are not limiting, such that other embodiments may be used, and changes may be made without departing from the spirit and scope of the invention.

The present invention is directed generally toward a device or apparatus for use in reducing the amount of silt, sedimentation and debris in storm water runoff or standing bodies of accumulated water being pumped or otherwise dispersed. In particular, the present invention comprises one or more dewatering bags that are particularly useful in clarifying dirty or muddy water, and that may be connected in tandem as any particular application requires. Said dewatering bags are substantially comprised of one or more permeable membranes, such that water can seep out of or otherwise escape through these membranes in all directions. In addition, such bags are preferably reusable in light of added features and improvements explained in greater detail below. According to a preferred embodiment of the present invention, chitosan is placed inside at least one dewatering bag at one or more optimal locations. This chitosan may be in one of several different forms, although a time-release gel form is particularly preferred. Because of the increased water clarification capabilities arising due to the introduction of chitosan, the inventive dewatering bags accumulate silt and sediment and thereby become clogged at a much faster rate, such that a plurality of separated interior sections having varying rates of permeability are preferred.

Figure 1:
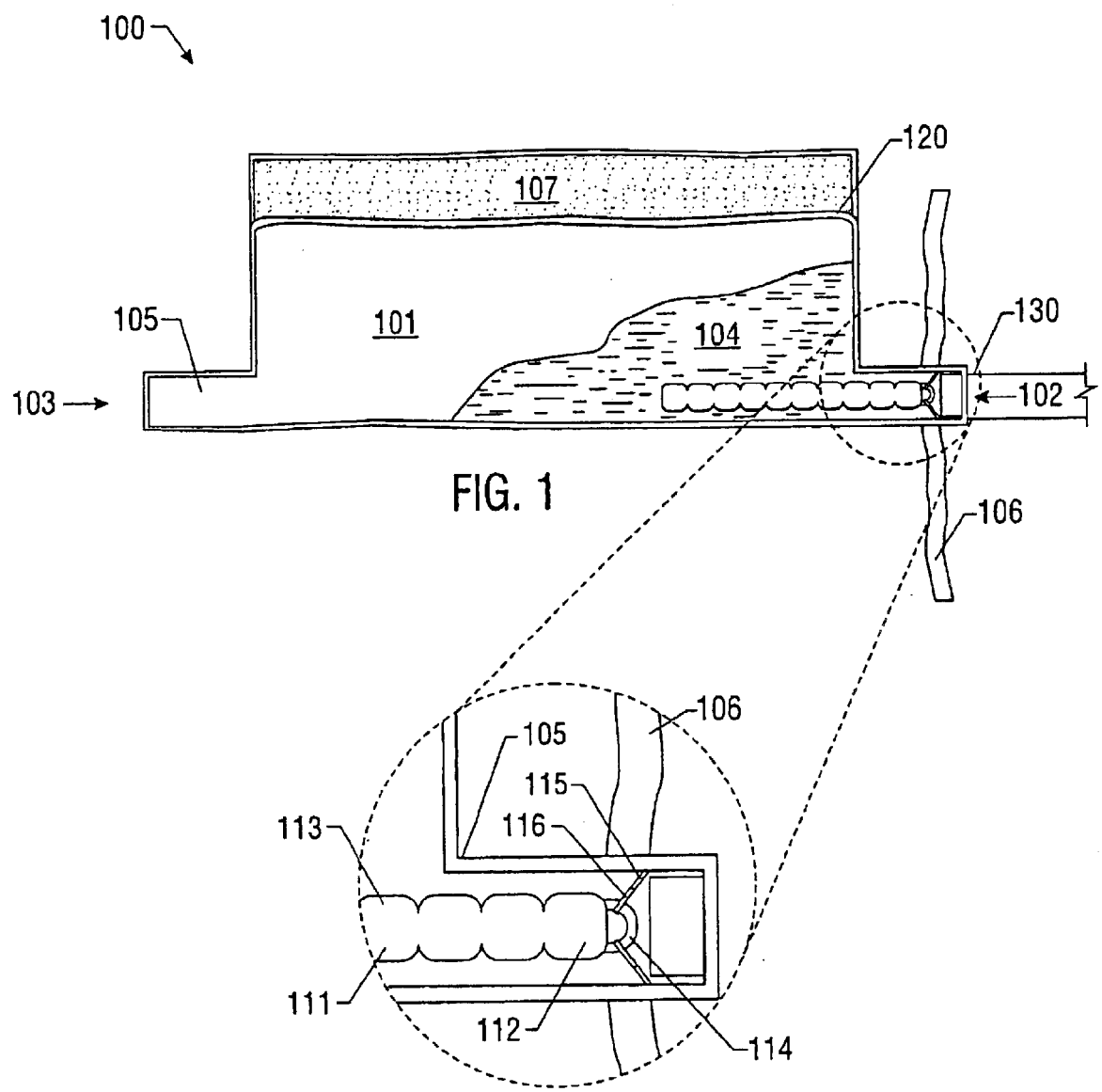
FIG. 1 is a top perspective view of a prior art dewatering bag in operation.
Figure 2:
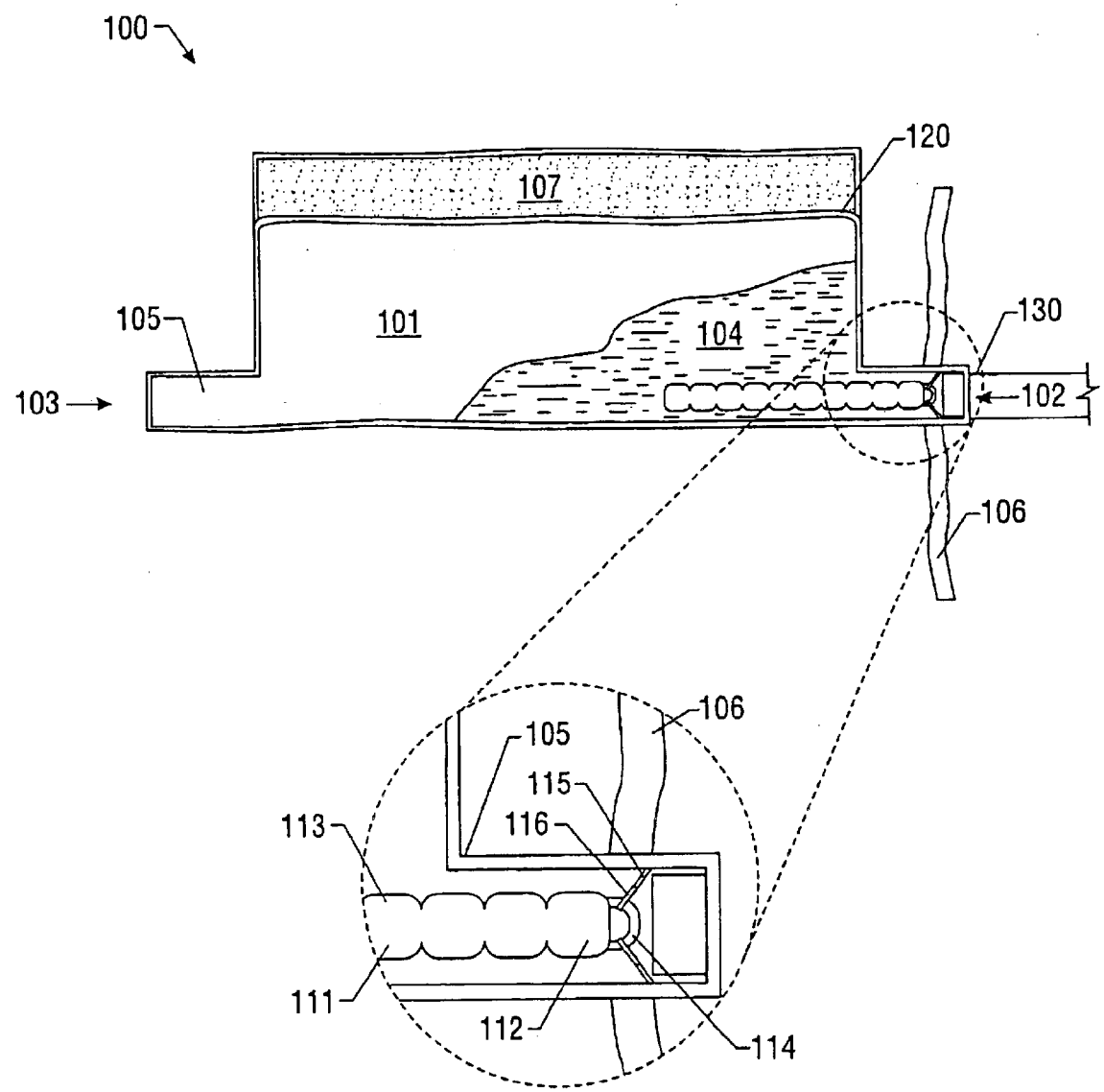
FIG. 2 is a partially cut-away top direct view of a preferred embodiment of the present invention.

Referring now to FIG. 2, a partially cut-away top direct view of a particularly preferred embodiment of the present invention is illustrated. A single dewatering bag 100 comprises a first permeable membrane 101 forming substantially all bag walls and having a first open end or opening 102, a second end 103, an interior space 104, and a plurality of fine openings or passageways (not scalable) in the permeable membrane communicating said interior space with the exterior of the dewatering bag. First permeable membrane 101 preferably comprises a non-woven geotextile fabric capable of passing fluid, although other suitable materials are also contemplated. First open end 102 comprises an inlet to accommodate incoming water to be filtered or clarified, and second end 103 may be closed or sewn off, or alternatively may comprise an outlet for releasing overflow should the fluid passing capacity of the dewatering bag be insufficient to accommodate the desired incoming fluid flow. First and second ends 102 and 103 may comprise simple inlet and outlet holes, but in a preferred embodiment both ends comprise built-in spouts 105 that branch away from the general mass of the dewatering bag. Such spouts are preferably made from the same material as permeable membrane 101, and are preferably about six inches in diameter, such that any pipe or hose 130 up to that size may be accommodated. Tie down straps or ropes 106 are used to firmly wrap around spout 105 and secure pipe or hose 130 therein, thereby preventing any gross leakage of unfiltered water. Alternatively, one or both of said ends may comprise other forms of couplers or connectors for connecting a dewatering bag to a hose, pipe, another dewatering bag or any other inlet or outlet source. Such couplers or connectors could include, for example, attached PVC piping, hoses, clamps or any other suitable connecting means as would be readily understood by those skilled in the art.

One feature of the present invention is the ability to connect a plurality of dewatering bags together from outlet to inlet in order to increase the overall fluid passing capacity of the system without the creation of large and cumbersome bags. Such connections may be facilitated via the use of connecting pipes or hoses of any desired length, with such connections being identical or similar to those described above. In such a tandem-like embodiment, second end 103 of all dewatering bags except the final one would not be sewn off, but rather would comprise an outlet for passing additional fluid to the following dewatering bags. Besides adding capacity, connecting multiple smaller dewatering bags also adds flexibility in where water will be dispersed. In the event that no sufficiently large single localized area is convenient or available, long pipes or hoses may connect multiple dewatering bags remotely, such that water can be dispersed in separate and distant locations as desired.

In a preferred embodiment, chitosan is applied at one or more locations inside the dewatering bag. Such chitosan is preferably located or applied at optimized locations within the bag, such that its exposure to incoming water is maximized. As a result, the chitosan enhanced dewatering bag is capable of coagulating fine solids in fluids, such that passage of pollution, silt and sediment through the fine openings in the permeable membrane of the dewatering bag is reduced. Chitosan is available commercially from several sources, with one example being Vanson, Inc. of Redmond, Wash. chitosan can be obtained in a basic white or beige granular or powdery form, or alternatively, may come in a liquid form or in a gel time-release form. Such forms are commercially available, for example, from Vanson, Inc. under the trade names "Storm Klear Liqui-Floc" and "Storm Klear Gel Floc" respectively. Although any form of chitosan may be applied to a dewatering bag in any way, use of a time release gel form is preferred. Alternatively, other forms, such as a powder or liquid, may also be applied to the dewatering bag as deemed effective.

Referring again to FIG. 2, a particularly preferred application for chitosan is illustrated. Cakes or bars of a gel form of chitosan 111 are inserted and sewn into a permeable fabric sock 112, and preferably each gel cake or bar is sewn into a separate compartment 113 within the fabric sock. This fabric sock containing multiple chitosan gel bars comprises a loop 114 attached to a distal end of the sock, such that the entire sock may be attached, connected or otherwise anchored to a separate structure. As depicted in FIG. 2, a fabric sock containing one or more chitosan gel bars is attached or anchored to the inside of the inlet spout at first end or opening 102 by straps 115 sewn into the inner wall of the inlet spout and D-rings 116 connecting these straps with loop 114 of the fabric sock. Alternatively, or in addition to this location, one or more fabric socks may also be connected to any other location on the inner surface of first permeable membrane 101, first end 102, or second end 103. Attachment of a fabric sock inside the inlet spout is particularly preferred, however, as such a placement maximizes the exposure of incoming water to chitosan.

Figure 3:
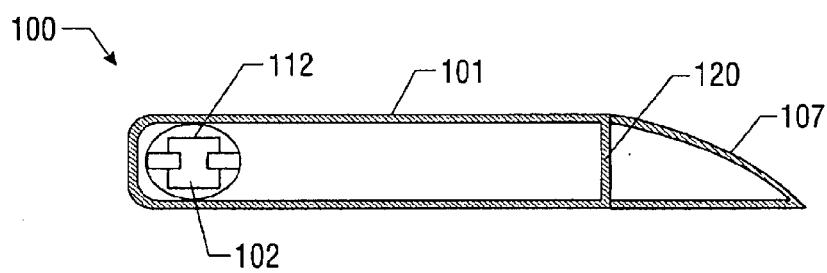
FIG. 3 is a side cross-sectional view of the embodiment of the present invention illustrated in FIG. 2.

Referencing FIG. 3, the particularly preferred embodiment of FIG. 2 is illustrated during operation and in a side cross-sectional view. Although dewatering bags are typically flat or deflated when not in use, dewatering bag 100 is depicted as having expanded as incoming water has filled the bag. Fabric sock 112 containing one or more chitosan gel bars is centrally anchored within the inlet spout at first end or opening 102, such that the entire sock becomes centrally and horizontally suspended within the inlet spout and inner space of the dewatering bag while any substantial fluid flow enters the inlet spout and dewatering bag. Although the fabric sock containing one or more chitosan gel bars may be anchored or located in other ways or configurations, exposure of incoming water to chitosan is greatly maximized in this manner, as the chitosan becomes more evenly disbursed along the incoming fluid flow. Alternatively, the fabric sock may be anchored further into the inlet spout, or even inside the dewatering bag but near the inlet spout, in order to realize a significant exposure of chitosan to incoming fluid. Because the increased water clarification capabilities arising due to chitosan cause pollutants, silt and sediment to coagulate much more rapidly, these enlarged suspended solids are much more prone to settle to the bottom of the dewatering bag or be retained by its permeable membrane. Accordingly, the dewatering bag becomes clogged at a much faster rate, such that additional devices for dealing with this phenomenon are desired.

Referring back to FIG. 2, a second permeable membrane 107 is illustrated as defining at least a portion of dewatering bag 100, and preferably extends from one side of the bag to the other side along a top surface. Second permeable membrane 107 also has a plurality of fine openings (not scalable) communicating at least a portion of the interior space of the bag with the exterior of the second permeable membrane. The permeability rate of second permeable membrane 107 is preferably much greater than the permeability rate of first permeable membrane 101, such that fluid escapes the dewatering bag much faster through the section defined by this second permeable membrane. This second permeable membrane preferably comprises a woven geotextile fabric, although other suitable materials are also contemplated, as will be understood by those skilled in the art. As can be seen in the cross-section of FIG. 3, this second permeable membrane preferably forms a top surface of dewatering bag 100, and is sewn onto or otherwise attached to first permeable membrane 101 both along the bottom edge of the bag furthest away from the inlet and along an upper portion of the bag. Second permeable membrane 107 thus comprises a part of the outer surface of the dewatering bag. Because this second permeable membrane passes fluid at a greater rate than the first permeable membrane, this second membrane typically comprises larger fine openings, such that silt and sediment may escape the bag more readily through this second membrane. Accordingly, the preferred location for this second membrane is along the top of the dewatering bag and away from the inlet. In addition, a baffle wall 120 is located inside the dewatering bag to reduce the access of silt and sediment to this second membrane.

Figure 4:
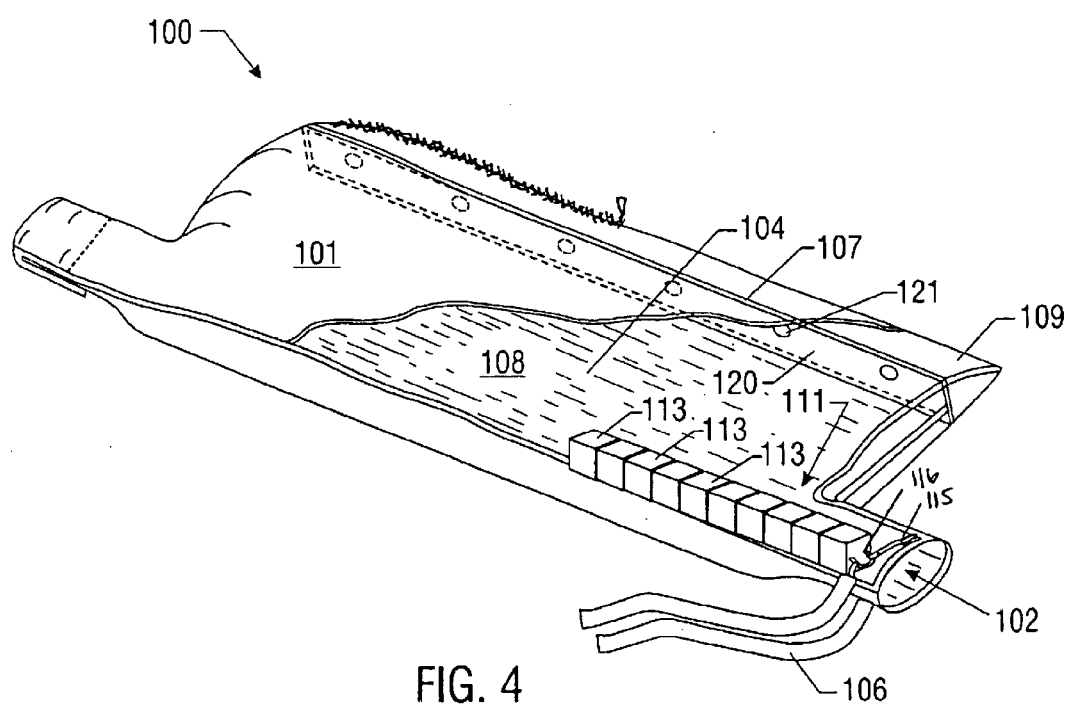
FIG. 4 is a partially cut-away top perspective view of the embodiment of the present invention illustrated in FIGS. 2 and 3.

Referring now to FIG. 4, the particularly preferred embodiment of FIGS. 2 and 3 is illustrated in a partially cut-away top perspective view. Baffle wall 120 extends from one side of dewatering bag 100 to an opposing side, such that this baffle wall separates interior space 104 into a first interior space 108 and a second interior space 109. Preferably, the inlet spout at first end or opening 102 directs fluid into first interior space 108, while second permeable membrane 107 passes fluid out of said second interior space 109, such that most silt, sedimentation and suspended solids are retained within first interior space 108. Baffle wall 120 also preferably extends from the bottom of the dewatering bag to the top, although other embodiments where the baffle wall stops short of the top or from either side of the dewatering bag are also contemplated. In a particularly preferred embodiment, baffle wall 120 is integrally formed with first permeable membrane 101, such that the baffle wall also comprises a non-woven geotextile fabric capable of passing fluid. One example of such an embodiment can best be seen in FIG. 3, whereby a cross-sectional view of dewatering bag 100 illustrates a continuous first permeable membrane 101 comprising the entire bottom surface of the bag, rising up through the side of the bag nearest the inlet spout at first end or opening 102, continuing onward to comprise most of the upper surface of the bag, and finally ending by comprising baffle wall 120. The bottom edge of this baffle wall is then sewn to the dewatering bag along the bottom surface of the bag.

Referring again to FIG. 4, baffle wall 120 comprises one or more enlarged openings 121 communicating first interior space 108 with second interior space 109. Openings 121 are preferably toward the upper part of baffle wall 120, such that the amount of silt and sediment passing from first interior space 108 through the baffle wall and into second interior space 109 is reduced. In this manner, fluid is able to more readily flow through the dewatering bag and be expunged, but unwanted dirt and other solids are impeded from accompanying such increased flow. The size of openings 121 may be varied as desired, and it is contemplated that an increased number of openings may result in a correspondingly reduced diameter for each opening with little change in the ability of fluid to pass through the baffle wall. In applications where clogging and reduced fluid flows are to be especially avoided, such openings may be maximized up to the point where the sum of the cross-sectional areas of all openings are equal or substantially similar to the cross-sectional area of the inlet at first end or opening 102. Such dimensions would maximize the amount of fluid that could pass through the baffle wall, in that the output of first interior space 108 would then match its input. Reduced diameters for openings 121 are preferable, however, where greater filtration and clarification of passed water is ultimately desired.

Another feature of the present invention is the ability to clean out and reuse the inventive dewatering bags rather than disposing of them after they become filled with silt and sedimentation. Accordingly, one or more zippers traversing one or more outer edges or seams of the dewatering bag are provided. When such zippers are unzipped, either a portion or all of the top of the dewatering bag may be distanced apart from the bottom of the dewatering bag, such that the interior space of the bag is readily accessible. In this manner, accumulated silt, mud and debris may be removed from the dewatering bag and disposed of in a responsible manner, such that the bag is emptied and ready for reuse. Any application of chitosan, such as one or more fabric socks containing bars of chitosan gel, may also be replaced or renewed as well. The dewatering bag may then zipped back up and reused again as desired.

Although the foregoing invention has been described in some detail by way of illustration and example for purposes of clarity and understanding, it will be recognized that the above described invention may be embodied in numerous other specific variations and embodiments without departing from the spirit or essential characteristics of the invention. Certain changes and modifications may be practiced, and it is understood that the invention is not to be limited by the foregoing details, but rather is to be defined by the scope of the appended claims.

What is claimed is:

1. An apparatus, comprising:
   (a) a first permeable membrane defining a bag and having a first opening, an interior space and a plurality of fine openings in said first permeable membrane communicating said interior space with the exterior of said permeable membrane, wherein said first opening further comprises an inlet; and
   (b) one or more applications of chitosan located within said bag, wherein at least one application of chitosan comprises a gel form, wherein said gel form of chitosan comprises one or more bars, said one or more bars being placed into a fabric sock, wherein said fabric sock is connected to an inner surface of said first permeable membrane or inlet.

2. An apparatus comprising:
(a) a first permeable membrane defining a bag and having a first opening, an interior space and a plurality of fine openings in said first permeable membrane communicating said interior space with the exterior of said permeable membrane, wherein said first opening further comprises an inlet, wherein said inlet defines a spout extending outwardly from said bag; and
(b) one or more applications of chitosan located within said bag.

3. The apparatus of claim 2, further comprising a fabric sock containing one or more applications of a gel form of chitosan, said sock being attached to or near an inner surface of said spout.

4. The apparatus of claim 3, whereby said sock is attached to an inner surface of said spout such that the sock becomes suspended horizontally within said spout during a substantial incoming fluid flow.

5. An apparatus, comprising:
(a) a first permeable membrane defining a bag and having a first opening, an interior space and a plurality of fine openings in said first permeable membrane communicating said interior space with the exterior of said permeable membrane, wherein said first permeable membrane comprises a non-woven geotextile fabric, wherein said first opening further comprises an inlet; and
(b) one or more applications of chitosan located within said bag.

6. An apparatus, comprising:
(a) a first permeable membrane defining a bag and having a first opening, an interior space and a plurality of fine openings in said first permeable membrane communicating said interior space with the exterior of said permeable membrane, wherein said first opening further comprises an inlet;
(b) one or more applications of chitosan located within said bag; and
(c) a second opening in said bag, said second opening further comprising an outlet.

7. The apparatus of claim 6, wherein said outlet defines a sealable spout extending outwardly from said bag.

8. An apparatus, comprising:
(a) a first permeable membrane defining a bag and having a first opening, an interior space and a plurality of fine openings in said first permeable membrane communicating said interior space with the exterior of said permeable membrane, wherein said first opening further comprises an inlet;
(b) one or more applications of chitosan located within said bag; and
(c) a zipper traversing one or more outer edges of said bag, whereby at least a portion of the top of said bag may be distanced apart from a portion of the bottom of said bag while said zipper is unzipped.

9. An apparatus, comprising:
(a) a first permeable membrane defining a bag and having a first opening, an interior space and a plurality of fine openings in said first permeable membrane communicating said interior space with the exterior of said permeable membrane, wherein said first opening further comprises an inlet;
(b) one or more applications of chitosan located within said bag; and
(c) a second permeable membrane connected to said first permeable membrane and defining at least a portion of said bag, said second permeable membrane having a plurality of fine openings communicating at least a portion of said interior space with the exterior of said permeable membrane, whereby the permeability rate of said second permeable membrane is different from the permeability rate of said first permeable membrane.

10. The apparatus of claim 9, wherein said second permeable membrane comprises a woven geotextile fabric having a permeability rate greater than that of said first permeable membrane.

11. The apparatus of claim 9, further comprising:
(d) a baffle wall located inside said bag and extending from one side of said bag to an opposing side, whereby said baffle wall separates said interior space into a first interior space and a second interior space, said baffle wall comprising one or more openings communicating said first interior space with said second interior space.

12. The apparatus of claim 11, wherein said inlet directs fluid into said first interior space and said second permeable membrane passes fluid out of said second interior space.

13. The apparatus of claim 11, wherein the sum of the cross-sectional areas of said one or more openings in said baffle wall is substantially similar to the cross-sectional area of said inlet.

14. The apparatus of claim 11, wherein the sum of the cross-sectional areas of said one or more openings in said baffle wall is smaller than the cross-sectional area of said inlet.

15. The apparatus of claim 11, wherein said baffle wall is integrally formed with said first permeable membrane.

16. A dewatering bag capable of removing silt, sedimentation and suspended solids from incoming water, comprising:
(a) a first permeable membrane defining a bag and having a first opening, an interior space and a plurality of fine openings in said first permeable membrane communicating said interior space with the exterior of said permeable membrane, wherein said first opening further comprises an inlet defining a spout extending outwardly from said bag;
(b) a fabric sock containing one or more bars of chitosan gel, said fabric sock being connected to an inner surface of said bag or inlet spout;
(c) a second permeable membrane connected to said first permeable membrane and defining at least a portion of said bag, said second permeable membrane having a plurality of fine openings communicating at least a portion of said interior space with the exterior of said permeable membrane, whereby the permeability rate of said second permeable membrane is greater than the permeability rate of said first permeable membrane; and
(d) a baffle wall located inside said bag and extending from one side of said bag to an opposing side, whereby said baffle wall separates said interior space into a first interior space and a second interior space, said baffle wall comprising one or more openings communicating said first interior space with said second interior space, wherein said inlet directs fluid into said first interior space and said second permeable membrane passes fluid out of said second interior space.

17. The apparatus of claim 16, further comprising:

(e) a second opening in said bag, said second opening further comprising an outlet, wherein said outlet defines a sealable spout extending outwardly from said bag.

18. The apparatus of claim 16, further comprising:

(e) a zipper traversing one or more outer edges of said bag, whereby at least a portion of the top of said bag may be distanced apart from a portion of the bottom of said bag while said zipper is unzipped.

19. A method for treating storm water, comprising the steps of:

(a) passing storm water through an inlet of a dewatering bag comprising a first permeable membrane and an outer surface; and (b) contacting said storm water with one or more applications of chitosan located within said dewatering bag; and (c) releasing said storm water through at least one of an outlet or said first permeable membrane of said dewatering bag.

20. The method of claim 19, further comprising the steps of:

(d) passing said storm water across a baffle wall disposed within said dewatering bag; and (e) releasing said storm water through at least one of an outlet or a second permeable membrane of said dewatering bag, wherein said second permeable membrane comprises at least a part of the outer surface of said dewatering bag.

21. The method of claim 19, further comprising the step of removing silt, sedimentation, or debris within said dewatering bag once said dewatering bag has been filled.

22. A storm water treatment apparatus, comprising:

(a) a means for passing storm water through an inlet of a dewatering bag comprising a first permeable membrane and an outer surface; and (b) a means for contacting said storm water with one or more applications of chitosan located within said dewatering bag; and (c) a means for releasing said storm water through at least one of an outlet or said first permeable membrane of said dewatering bag.

23. The apparatus of claim 22, further comprising:

(d) a means for passing said storm water across a baffle wall disposed within said dewatering bag; and (e) a means for releasing said storm water through at least one of an outlet or a second permeable membrane of said dewatering bag, wherein said second permeable membrane comprises at least a part of the outer surface of said dewatering bag.

24. The apparatus of claim 23, further comprising a means for removing silt, sedimentation, or debris within said dewatering bag once said dewatering bag has been filled.

* * * * *